(12) United States Patent
Spence, Jr.

(10) Patent No.: US 8,474,796 B2
(45) Date of Patent: Jul. 2, 2013

(54) UNIVERSAL WEAKENED STRUT SUPPORT

(76) Inventor: Ernest Spence, Jr., Bowling Green, KY (US)

( * ) Notice: Subject to any disclaimer, the term of this patent is extended or adjusted under 35 U.S.C. 154(b) by 322 days.

(21) Appl. No.: 12/950,802

(22) Filed: Nov. 19, 2010

(65) Prior Publication Data

US 2012/0126468 A1     May 24, 2012

(51) Int. Cl.
*F16F 5/00*    (2006.01)

(52) U.S. Cl.
USPC ............................ 267/64.12; 188/300; 188/69

(58) Field of Classification Search
USPC .................. 188/300, 265, 69; 267/64.12, 120
See application file for complete search history.

(56) References Cited

U.S. PATENT DOCUMENTS

| | | | | |
|---|---|---|---|---|
| 3,463,520 A | * | 8/1969 | Turro | 403/362 |
| 4,576,501 A | * | 3/1986 | McConnell | 403/59 |
| 4,865,169 A | * | 9/1989 | Rachels et al. | 188/300 |
| 5,024,303 A | * | 6/1991 | Kosloff | 188/300 |
| 5,529,148 A | * | 6/1996 | O'Leary | 188/67 |
| 6,142,699 A | * | 11/2000 | Pao | 403/109.5 |
| 6,345,794 B1 | * | 2/2002 | Varner | 248/230.1 |
| 2008/0016925 A1 | * | 1/2008 | Hawkinberry | 70/181 |

* cited by examiner

*Primary Examiner* — Xuan Lan Nguyen
(74) *Attorney, Agent, or Firm* — Mark S. Hubert

(57) ABSTRACT

An improved adjustable lift strut support adapted for permanent attachment to a shock tube of a vehicle's failed lift strut. It is capable of quick safe attachment to a plethora of different diameter struts. It wont damage the shock tube assembly if it is left connected to the shock tube, nor will it damage the vehicles hood or liftback when they are closed with the support connected to the shock tube.

7 Claims, 5 Drawing Sheets

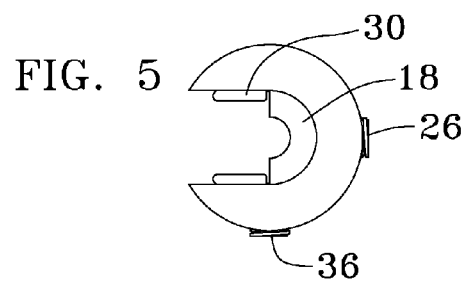
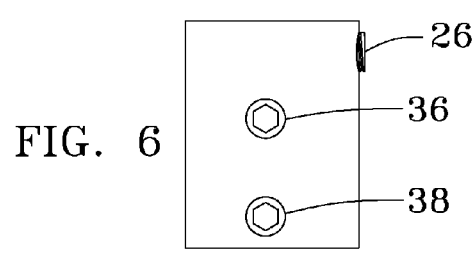
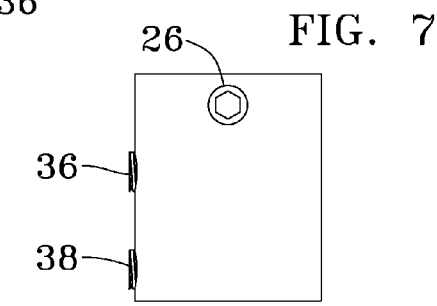
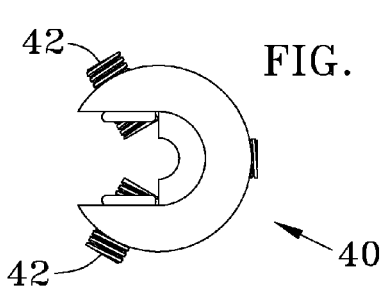
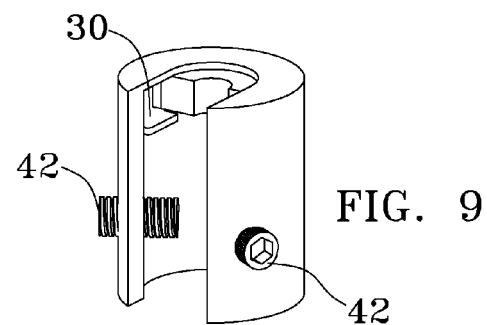
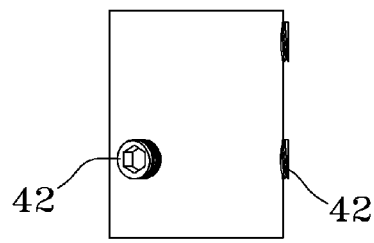
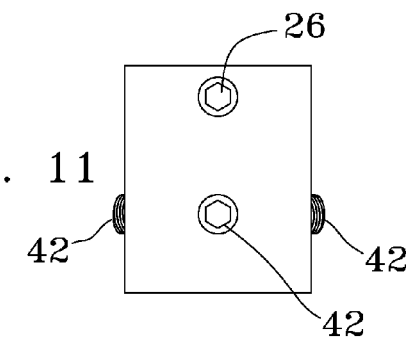

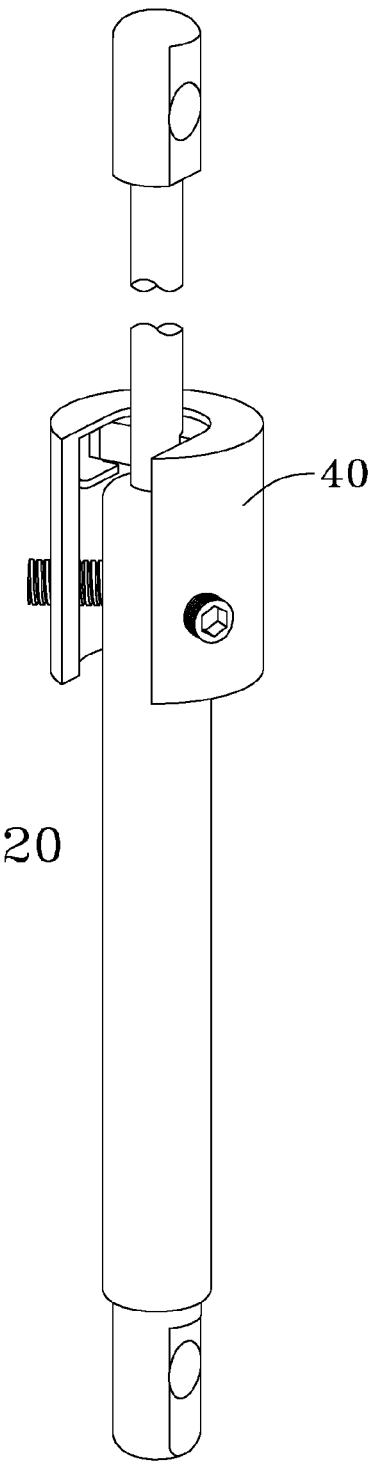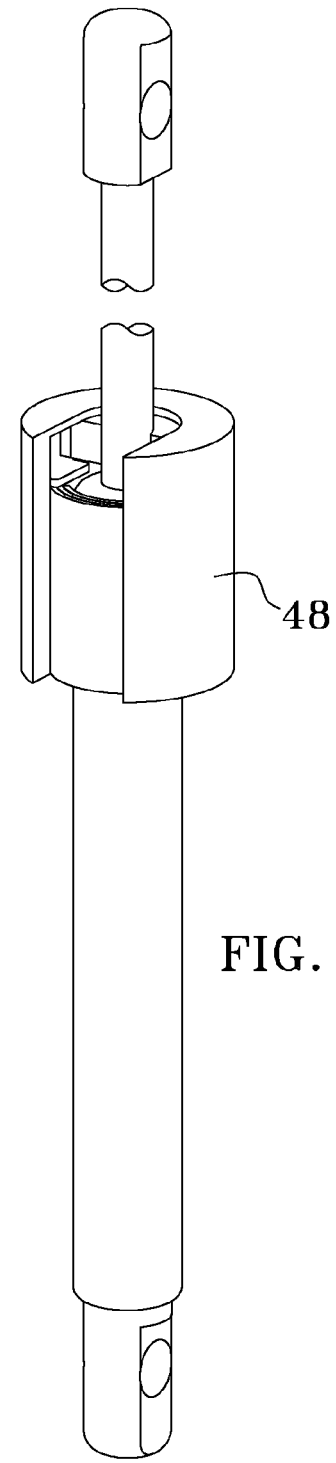

UNIVERSAL WEAKENED STRUT SUPPORT

BACKGROUND OF THE INVENTION

The present invention relates to a extremely compact weakened strut (shock tube assembly) support that will universally fit a plethora of different diameter shock tubes adapted to provide both safety and convenience for the user.

The life expectancy of motor vehicles has dramatically increased due to technological advances and with the cost of cars taking an all time high percentage out of the working classes' income, people are keeping their cars for longer periods. One of the components that commonly fail on vehicles is the pneumatic or hydraulic shock tube assembly or strut that hold the vehicle's hood up. These are expensive to replace whereas a simple inexpensive fix would work. The prior art is not universal, must be removed after each use and can damage the shock tube it is connected to if the hood is closed prematurely.

Henceforth, a universal fitting, permanently mounted weakened strut support would fulfill a long felt need in the automotive industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a support to safely hold up the hood (or trunk or liftback) of a vehicle that has a weakened or broken lift strut. It has many of the advantages mentioned heretofore and many novel features that result in a new support which is not anticipated, rendered obvious, suggested, or even implied by any of the prior art, either alone or in any combination thereof.

In accordance with the invention, an object of the present invention is to provide an improved lift strut support capable of universally fitting a plethora of struts.

It is another object of this invention to provide an improved an improved strut support capable of permanent attachment to the shock tube.

It is a further object of this invention to provide an improved strut support that is simple to operate and adjust.

It is still a further object of this invention to provide for an improved strut support that wont damage the shock tube assembly if it is left connected to the shock tube.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

BRIEF DESCRIPTION OF THE DRAWINGS

FIG. 5 is a bottom view of the preferred embodiment strut support;

FIG. 6 is a side view of the preferred embodiment strut support;

FIG. 7 is a rear view of the preferred embodiment strut support;

FIG. 8 is a top view of the first alternate embodiment strut support;

FIG. 9 is a front perspective view of the first alternate embodiment strut support;

FIG. 10 is a side view of the first alternate embodiment strut support;

FIG. 11 is a back view of the first alternate embodiment strut support;

FIG. 20 is a perspective front view of the first alternate embodiment strut support installed on a shock tube with the piston extended; and FIG. 21 is a perspective front view of the third alternate embodiment strut support installed on a shock tube with the piston extended.

DETAILED DESCRIPTION

Figure 1:
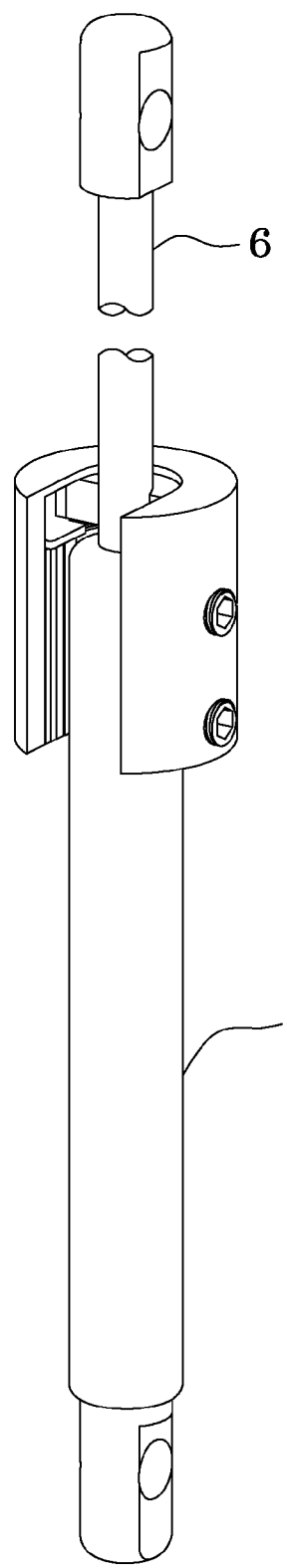
FIG. 1 is a perspective front view of the preferred embodiment strut support installed on a shock tube with the piston extended.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

The strut support 2 was intended to let mechanics work under the hood of a vehicle having a failed or leaky gas strut support although it works equally well on any support such as those found on a vehicle's trunk, hatch or the like. Looking at FIGS. 1 and 2 the advantages of the strut support 2 can best be seen.

Figure 2:
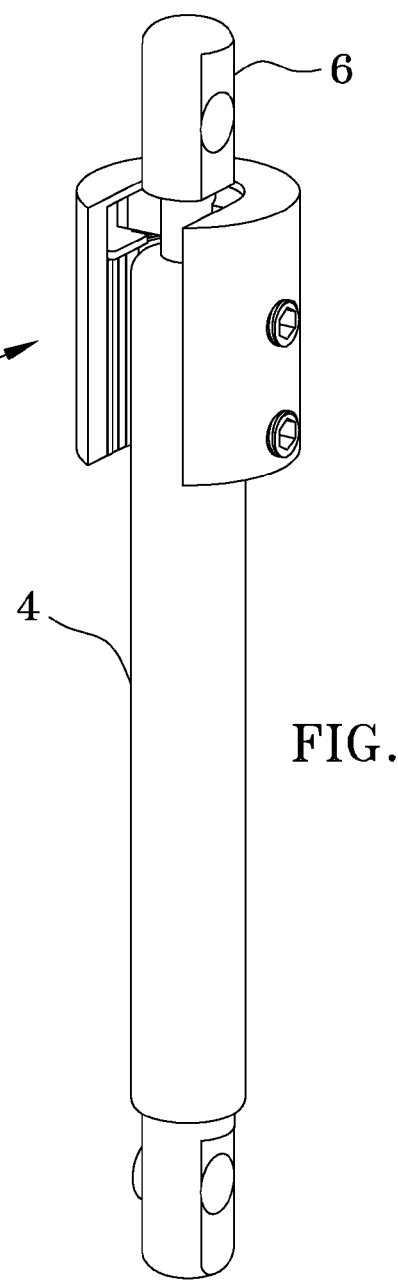
FIG. 2 is a perspective front view of the preferred embodiment strut support installed on a shock tube with the piston reteacted.

The strut support 2 may be mechanically affixed to the upper end of the shock tube 4 of a gas strut support and engaged to frictionally constrain the piston arm 6 in the extended position (FIG. 1) or it may be left mechanically affixed to the shock tube 4 and frictionally disengaged from the piston arm 6 such that the piston arm 6 is free to be retracted back into the shock tube 4 (FIG. 2). Once installed the strut support need not be removed again, providing a lost cost alternative to replacing a failed gas strut support.

Figure 3:
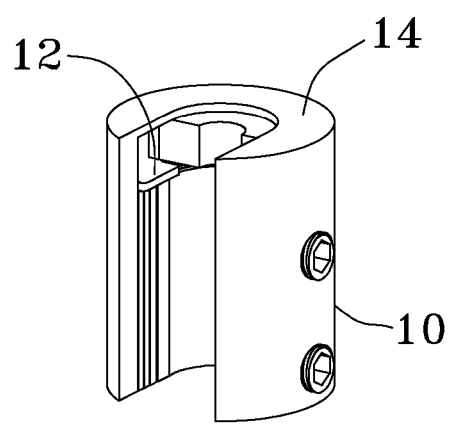
FIG. 3 is a perspective front view of the preferred embodiment strut support.
Figure 4:
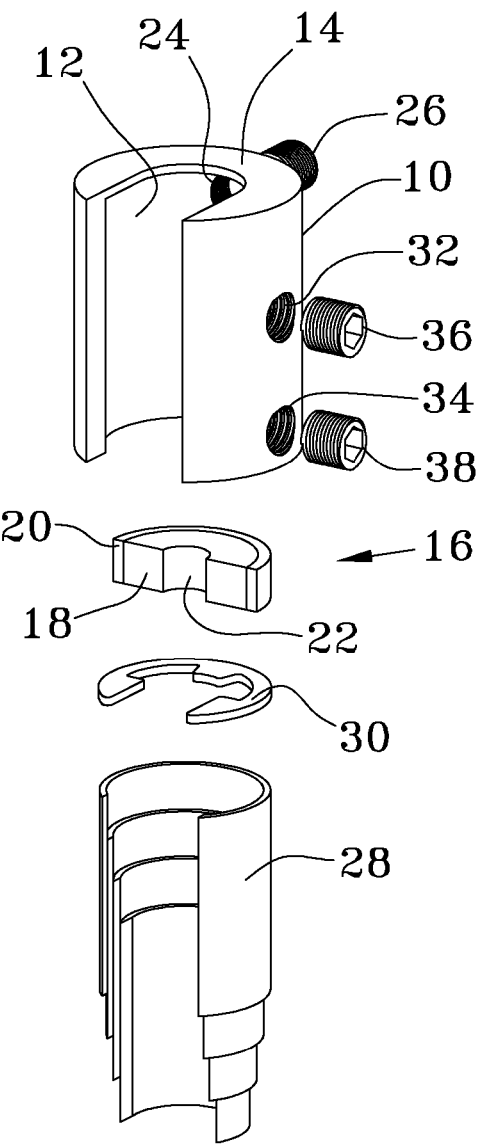
FIG. 4 is an exploded view of the preferred embodiment strut support.
Figure 12:
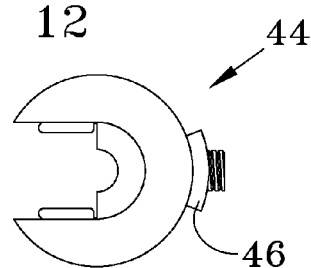
FIG. 12 is a top view of the second alternate embodiment strut support.
Figure 13:
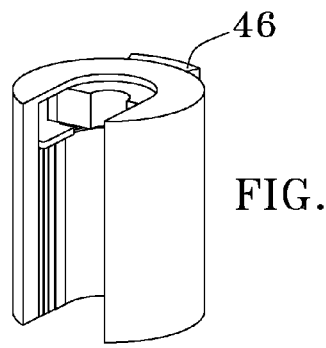
FIG. 13 is a front perspective view of the second alternate embodiment strut support.
Figure 14:
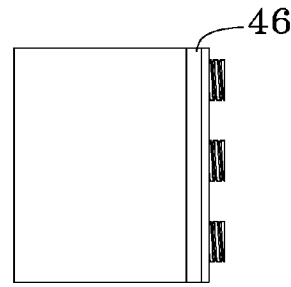
FIG. 14 is a side view of the second alternate embodiment strut support.
Figure 15:
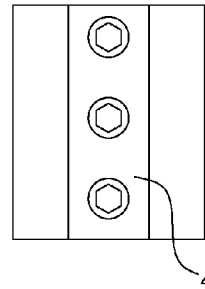
FIG. 15 is a rear view of the second alternate embodiment strut support.
Figure 16:
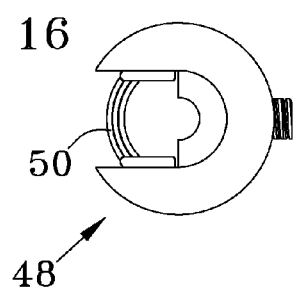
FIG. 16 is a top view of the third alternate embodiment strut support.
Figure 17:
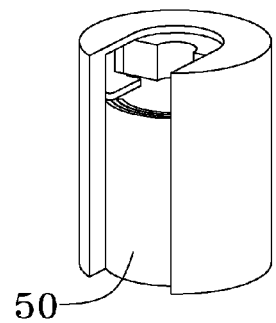
FIG. 17 is a front perspective view of the third alternate embodiment strut support.
Figure 18:
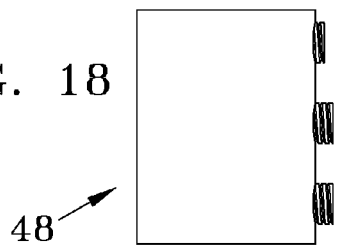
FIG. 18 is a side view of the third alternate embodiment strut support.
Figure 19:
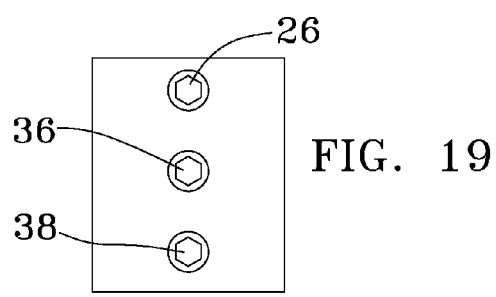
FIG. 19 is a rear view of the third alternate embodiment strut support.

Looking at FIGS. 3 and 4, the assembled and disassembled front perspective views of the preferred embodiment strut support, in light of FIGS. 5, 6 and 7 the various parts and the overall operation can best be explained. The housing cylinder 10 has the physical configuration of a right cylinder with a round bottom dado 12 formed along the longitudinal axis of the cylinder 10 so as to form a slot to allow the placement of a shock tube 4 therein. The top of the housing cylinder 10 has an internal flange 14 formed thereon. This flange 14 serves to help constrain the semi circular friction pad assembly 16 within the housing cylinder 10. The friction pad assembly 16 is made of a semi circular resilient flexible polymer friction disk 18 attached to a semi circular rigid backing plate 20. The friction disk 18 has a semi circular central groove 22 therein to increase the amount of surface area of the friction disk that contacts the piston arm 6. There is a first threaded recess 24 formed normally in the housing cylinder 10 adjacent where the backing plate 20 resides such that a matingly conformed first set screw 26 may be threadingly engaged to advance the friction pad assembly 16 parallel to the transverse axis of the dado 12. Below the friction pad assembly 16 and still residing within the dado 14 there is a nested set of decreasing diameter partially circular shims 28. A partially circular spacer 28, (shown as a circlip in FIG. 4) provides a sliding surface for movement of the friction pad assembly 16 rather than having it slide across the top of the nested shims 28. A second threaded recess 32 and third threaded recess 34 are formed in the housing cylinder 10 adjacent where the circular shims 28 reside such that a matingly conformed second set screw 36 and third set screw 38 may be threadingly engaged to advance in their recesses to exert pressure on one side of the outermost nested shim to elastically deform them reduce the inside diameter of the circular shims 28. This pressure frictionally holds the strut support onto the outside of the shock tube 4.

In operation the support 2 is placed around the outside of a shock tube 4 of a failed lift strut as may be found under the hood of a car. Depending upon the outside diameter of the shock tube 4 some of the innermost of the nested shims 28 may have to be removed to accommodate the shock tube 4. The top end of the shock tube 4 is slid in the dado 12 of the strut support 2 such that the washer 30 resides adjacent to the end of the shock tube 4. In this position the friction pad assembly 16 extends beyond the end of the shock arm 4 and resides adjacent to the piston arm 6 of the strut. The second set screw 36 and third set screw 38 are threadingly engaged to advance in their recesses until they contact the outer surface of the outermost of the curved shims 28 and elastically deform them until they frictionally secure the support 2 to the outside of the shock tube 4. The first set screw 26 is threadingly engaged until it contacts the backing plate 20 and advances the friction pad assembly 16 until the semi circular central groove 22 of the friction disk 18 contacts the piston arm 6 with enough force to frictionally engage and constrain the movement of the piston arm 6. Once installed only the first set screw 26 need be backed out to allow the piston arm 6 to freely retract into the shock tube 4 and close the vehicle's hood.

FIGS. 8, 9, 10, 11 and 20 show the first alternate embodiment strut support 40. In this embodiment the frictional engagement between the support 40 and the shock tube 4 is accomplished by a grouping of set screws 42 about the housing cylinder 10 that can be advanced to bear against the outside of the shock tube 4. The curved shims 28 are not necessary in this embodiment. This embodiment like the preferred embodiment universally fit different sized struts.

FIGS. 12, 13, 14 and 15 illustrate a second alternate embodiment strut support 44 that differs from the preferred embodiment by the addition of a reinforcement strip 46 in the area surrounding where the threaded orifices 24, 32 and 34 lie, and the relocation of the second and third threaded orifices 32 and 34 from the side of the housing cylinder 10 to the back.

FIGS. 16, 17, 18, 19, and 21 illustrate the third alternate embodiment strut support 48 which differs from the preferred embodiment by the use of a set of nested quarter circle shims 50 (instead of the circular shims 28) that are inserted into the dado 12 after the shock tube 4, and also by the relocation of the second and third threaded orifices 32 and 34 to the back of the housing cylinder 10. In operation the second and third set screws 36 and 38 threadingly advance from their housing to contact the shock tube 4 and force it into frictional engagement with the quarter circle shims 50.

It is to be noted that the frictional engagement of the piston arm 6 is accomplished in the same way in each of the embodiments. Although all embodiments are illustrated with set screws it is known that there are a host of equivalents that may be substituted such as winged bolts, T-handle bolts and the like.

Having thus described the invention, what is claimed as new and desired to be secured by Letters Patent is as follows:

1. A universal weakened strut support comprising:
   a body having a dado formed along a longitudinal axis of said body;
   a shim assembly residing in said dado;
   at least one shim assembly adjustment means residing in said body adjacent said shim assembly and adapted to deform said shim assembly for frictional engagement with a shock tube of said weakened strut support;
   a frictional assembly residing in said dado adjacent said shim assembly;
   a frictional assembly adjustment means residing in said body adjacent said frictional assembly and adapted to advance said frictional assembly for frictional engagement with a piston arm of said weakened strut support;
   wherein said shim assembly is a set of nested partially circular shim plates of graduated sizes.

2. The universal weakened strut support of claim 1 wherein said frictional assembly is a resilient polymer partially circular disk affixed to a rigid backing plate.

3. The universal weakened strut support of claim 2 wherein said frictional assembly adjustment means further comprises a first set screw that is threadingly engaged into a first matingly conformed orifice formed through said body so that upon threading, is to advance and extend into said dado, exerting a force upon said backing plate to move said frictional disk into a frictional engagement with said piston arm of said weakened strut support.

4. The universal weakened strut support of claim 1 further comprising a planar spacer residing between said shim assembly and said frictional assembly.

5. A universal weakened strut support comprising:
   a body having a dado formed along a longitudinal axis of said body;
   a shim assembly residing in said dado;
   at least one shock tube attachment means extendable from said body into said dado for frictional engagement with a shock tube of said weakened strut support;
   a frictional assembly residing in said dado adjacent said shim assembly; and a frictional assembly adjustment means residing in said body adjacent said frictional assembly and adapted to advance said frictional assembly for frictional engagement with a piston arm of said weakened strut support;
wherein said frictional assembly is a resilient polymer partially circular disk affixed to a rigid backing plate.

6. The universal weakened strut support of claim 5 further comprising a planar spacer residing between said shim assembly and said frictional assembly.

7. A universal weakened strut support comprising:
a body having a dado formed along a longitudinal axis of said body;
a shim assembly residing in said dado;
a shock tube clamping means residing in said body adapted to force a shock tube of said weakened strut support into frictional engagement with said shim assembly;
a frictional assembly residing in said dado adjacent said shim assembly;
a frictional assembly adjustment means residing in said body adjacent said frictional assembly and adapted to advance said frictional assembly for frictional engagement with a piston arm of said weakened strut support;
further comprising a planar spacer residing between said shim assembly and said frictional assembly.

* * * * *